(12) United States Patent
Baroudi et al.

(10) Patent No.: US 7,656,818 B1
(45) Date of Patent: Feb. 2, 2010

(54) CUSTOMIZABLE NETWORK DEVICE MANAGEMENT METHODS AND SYSTEMS

(75) Inventors: Mihyar Baroudi, San Jose, CA (US); Thanh Luu, San Jose, CA (US); Jason Pfeifer, Austin, TX (US); Clyde L. Wildes, San Francisco, CA (US); Yu Zhang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 783 days.

(21) Appl. No.: 11/261,366

(22) Filed: Oct. 28, 2005

(51) Int. Cl.
*H04L 12/28* (2006.01)
(52) U.S. Cl. .................... 370/254; 709/220
(58) Field of Classification Search .......... 370/252, 370/253, 329; 709/220–229
See application file for complete search history.

(56) References Cited

U.S. PATENT DOCUMENTS

| | | | |
|---|---|---|---|
| 6,484,261 B1 * | 11/2002 | Wiegel | 726/11 |
| 6,959,332 B1 * | 10/2005 | Zavalkovsky et al. | 709/223 |
| 2008/0271109 A1 * | 10/2008 | Singh et al. | 726/1 |

OTHER PUBLICATIONS

Cisco Systems, Inc., Embedded Event Manager 2.0, 2004, pp. 1-68.

\* cited by examiner

*Primary Examiner*—Phuc H Tran
(74) *Attorney, Agent, or Firm*—Haynes and Boone, LLP

(57) ABSTRACT

Methods and systems for providing customizable network device management are disclosed. In one such method, a user-created policy is received and registered on a network device, such as a router. An event identified by the policy is detected at the network device. In response, the policy runs on the network device and an action specified by the policy is performed. The policy can be prepared by a user of a remote computing device, uploaded to the network device, and registered on the network device. In various implementations, the policy can be provided in the form of a script or applet executable by the network device.

19 Claims, 3 Drawing Sheets

CUSTOMIZABLE NETWORK DEVICE MANAGEMENT METHODS AND SYSTEMS

BACKGROUND

1. Field of the Invention

The present invention generally relates to networked computing systems, and, more particularly, to the management of such systems in response to various conditions.

2. Related Art

In modern networked computing environments, it is often desirable to customize aspects of a network in order to suit specific implementations. In particular, users may wish for various network devices to operate differently, depending on the occurrence of one or more conditions. For example, when an individual network device fails under certain conditions, it may be necessary to disable the failed device. However, under other conditions, it may be advantageous to switch to a backup network device or merely receive notification of the failure.

One prior approach to network customization involves the use of customer-specific command-line interface (CLI) commands provided by a network software provider. Under this approach, the software provider may create specialized CLI commands that cause the network device to implement particular functionality requested by its customers. Unfortunately, such an approach is not always sufficiently flexible to address the changing needs of customers. Typically, customers are forced to remotely access the network device and issue the specialized CLI commands for each desired change in device behavior. Customers are also forced to conform to the particular syntax and potentially limited functionality associated with the commands as implemented by the software provider. Moreover, such specialized CLI commands frequently remain undocumented by the software provider, further complicating their use by customers.

Another approach to network customization involves the use of external polling of network devices. In this approach, scripts or policies running on separate devices external to the network device may poll the device or filter error messages provided by the device in order to determine its status. Nevertheless, such external processes do not necessarily have readily available access to real-time system data of the device. Rather, such processes generally observe systems and networks from the outside and attempt to receive relevant performance data via available communication transports which are often based on restricted low performance polling mechanisms. Indeed, when network devices encounter problems affecting network communications, the devices may be wholly unable to provide any error messages to such external devices or respond to external polling requests.

Accordingly, there is a need for an improved approach to network management that overcomes the deficiencies in the prior art as discussed above. In particular, there is a need to provide increased control to users over how network devices behave in response to the occurrence of various network-related events.

BRIEF DESCRIPTION OF THE FIGURES

Like element numbers in different figures represent the same or similar elements.

DETAILED DESCRIPTION

Figure 1:
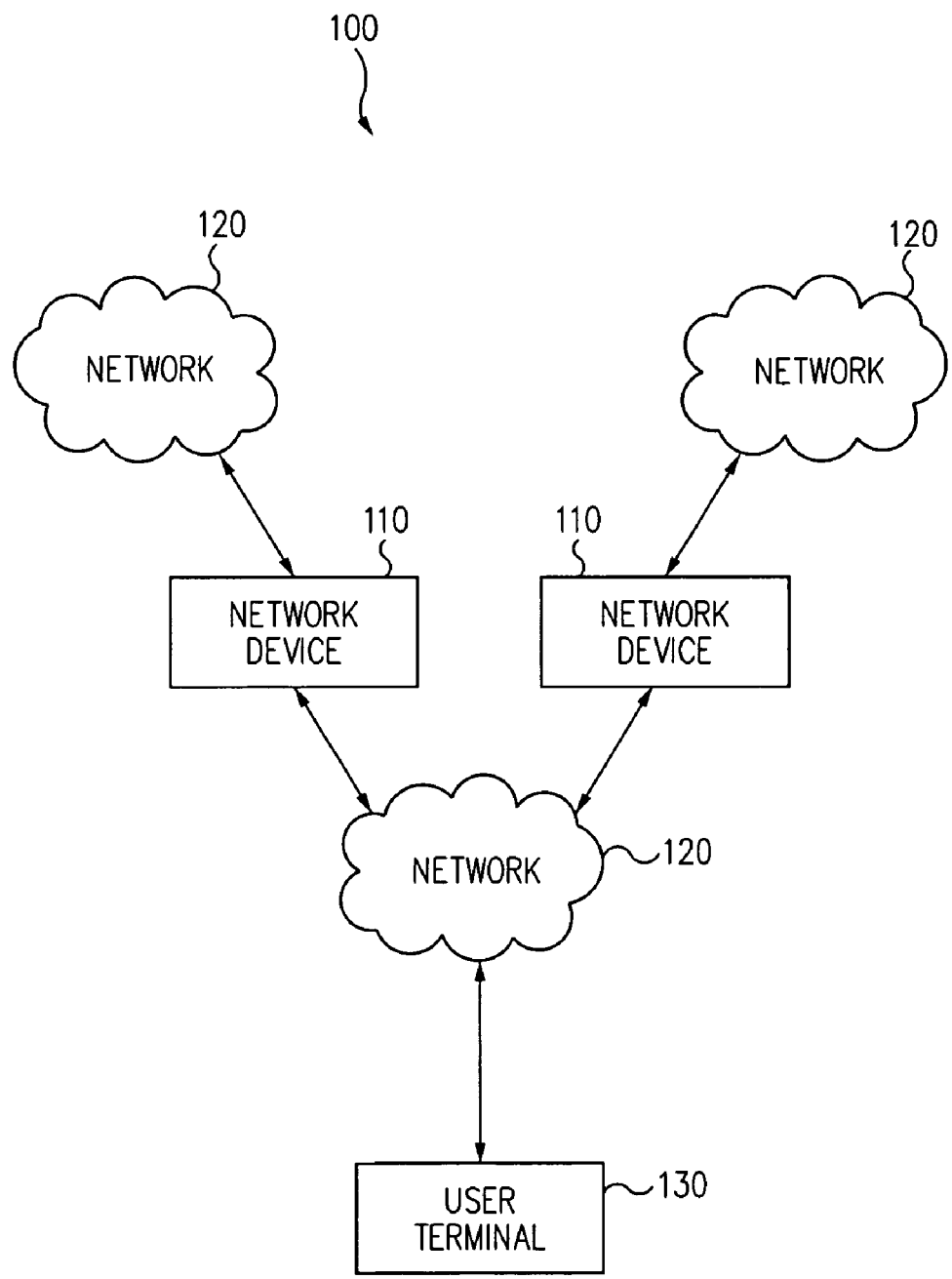
FIG. 1 is a block diagram illustrating a networked system supporting customizable network device management in accordance with an embodiment of the present invention.

Referring now to the drawings wherein the showings are for purposes of illustrating embodiments of the present invention only, and not for purposes of limiting the same, FIG. 1 is a block diagram illustrating a networked system 100 supporting customizable network device management in accordance with an embodiment of the present invention.

As illustrated, a plurality of networks 120 are provided. Each of networks 120 can be implemented as one or more landline networks, wireless networks, intranets, portions of the Internet, and/or other network technologies known in the art.

Communication between the networks 120 is facilitated by a plurality of network devices 110. In various embodiments, each of network devices 110 can be implemented as routers, general purpose computing devices, application-specific computing devices, and/or other computing devices adapted to support communication between networks 120. Each of network devices 110 can be implemented with a data transceiver, processor, and memory for performing a method of managing the network device 110, as further described herein.

As illustrated, a user terminal 130 is also provided in communication with one of networks 120. Typically, user terminal 130 will be situated at a location conveniently accessible by a user responsible for maintaining the performance of networks 120. For example, in one embodiment the user may be a customer of a provider of one of network devices 110. By accessing network devices 110 through user terminal 130 over network 120, the user can provide policy information to network devices 110 for customizing the management of network devices 110, as further described herein. Similar to network devices 110, user terminal 130 can be implemented as one or more general purpose computing devices, application-specific computing devices, and/or other computing devices.

Figure 2:
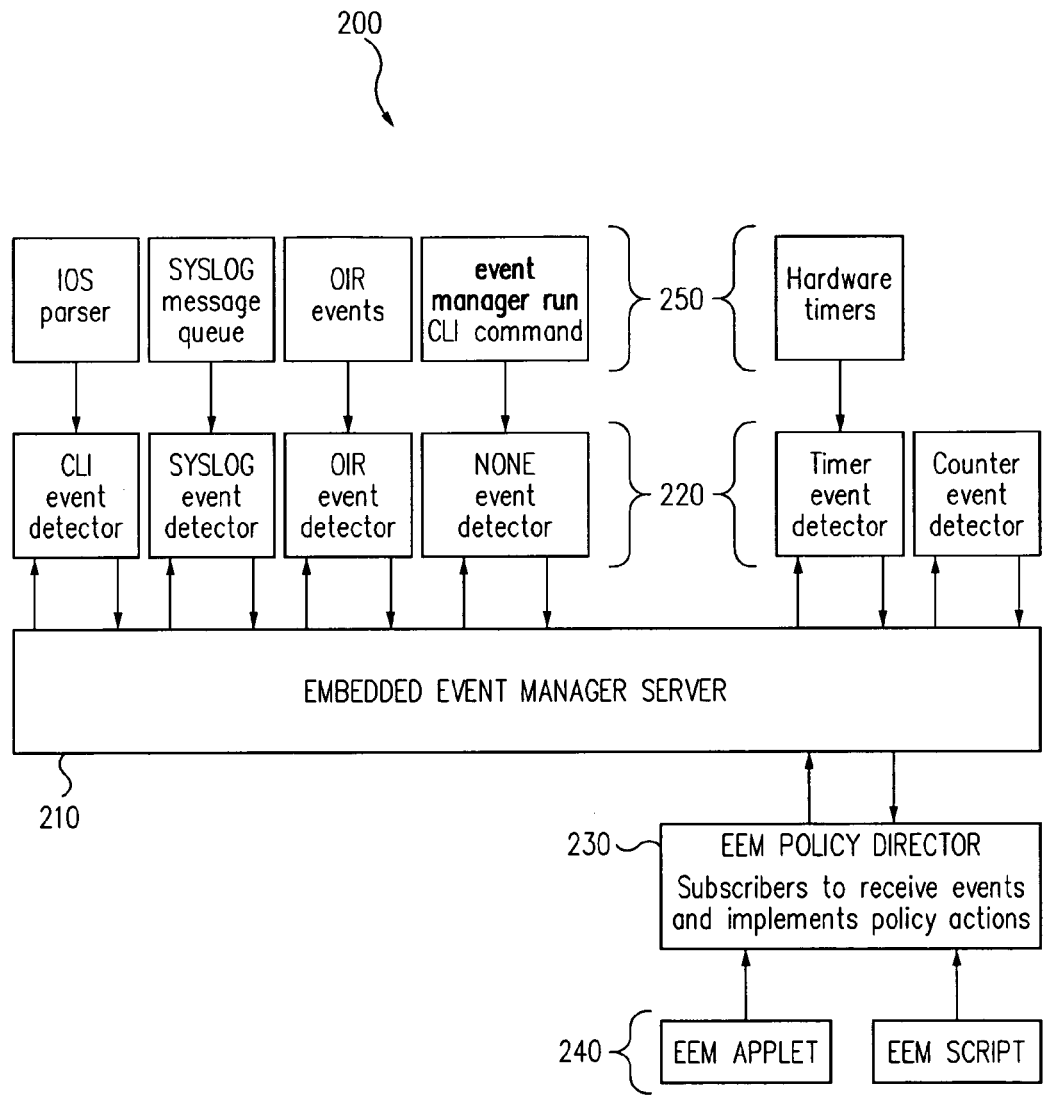
FIG. 2 is a block diagram illustrating a plurality of software components providing customizable network device management in accordance with an embodiment of the present invention.

FIG. 2 illustrates a block diagram of a plurality of software components running on one of network devices 110 in accordance with an embodiment of the present invention. It will be appreciated that the components illustrated in FIG. 2 correspond to various processes resident in a computer-readable medium associated with the network device 110 and run by a processor of the network device 110. In one embodiment, the software components of FIG. 2 can be implemented in a network device 110 running a Cisco IOS operating system with Embedded Event Manager 2.1 support, which is available from Cisco Systems, Inc. of San Jose, Calif.

As identified in FIG. 2, an event manager server 210 is provided for coordinating the various illustrated processes running on network device 110. A plurality of user-created policies 240 are provided that specify various actions which are conditioned on the occurrence, or non-occurrence, of one or more events detected at the network device 110. The user of user terminal 130 can provide policies 240 to the network device 110 which are then run by the network device 110 in response to events detected by software processes running on the network device 110. Advantageously, this arrangement can provide users the ability to customize the operation of the network device 110 in response to various events, without requiring the user to rely merely on direct entry of CLI commands, external polling, or the receipt of error messages from the network device 110 across network 120 at the time of each desired change.

As illustrated, policies 240 can be implemented in the form of applets or scripts. Applets can comprise a set of particular CLI commands supported by the operating system of network device 110 to be executed in response to various events detected at the network device 110. Scripts can comprise code that includes one or more conditional processes to be performed in response to detected events. In various embodiments, such scripts can be prepared in accordance with an appropriate scripting language such as, for example, Tool Command Language (Tcl) version 8.3.4. It will be appreciated that the use of scripts in policies 240 can permit complex arrangements of conditional actions to be performed in response to one or more detected events, thereby providing increased flexibility to users.

Policies 240 are registered with policy director 230 which subscribes to receive events identified by the policies 240. If policy director 230 receives a notification of the occurrence of an event corresponding to one of policies 240, policy director 230 can run the relevant policy 240 and implement one or more actions, if any, called for by the policy 240.

As further illustrated in FIG. 2, a plurality of event detectors 220 are provided in communication with a plurality of possible event sources 250 and event manager server 210. Event sources 250 correspond to various events relevant to the performance of network device 110 and/or its operation in conjunction with network 120. For example, possible event sources include an Internetwork Operating System (IOS) parser, messages logged by network device 110 (e.g. SYSLOG message queue), hardware insertion or removal (e.g. OIR events), the running of a CLI command on the network device 110, and hardware timers. It will be appreciated, however, that any event pertaining to the performance or operation of network device 110 or network 120 can be used as a possible event source 250. Accordingly, additional event sources (not shown) can be provided as may be desired for providing other events to appropriate event detectors 220.

Each of event detectors 220 can be selectively enabled by event manager server 210 upon the registration of a policy 240 identifying a particular event of interest. When an event corresponding to a registered policy 240 is detected, event detectors 220 can notify event manager server 210 of the event which in turn passes the notification on to policy director 230.

As illustrated, a plurality of event detectors 220 can be provided which correspond to various event sources 250. For example, a CLI event detector screens command-line interface (CLI) commands received over one of networks 120 and notifies event manager server 210 when a received CLI command matches a command specified by a policy 240. A SYSLOG event detector screens messages logged by the network device 110 (i.e. syslog messages) and notifies event manager server 210 when a logged message matches a message specified by a policy 240. An online insertion and removal (OIR) event detector publishes events in response to the insertion and/or removal of hardware at the network device 110, such as cards in a router.

Additional event detectors 220 can also be provided for triggering policies 240 to be run manually. For example, the NONE event detector determines when network device 110 receives a CLI command instructing it to manually run a particular policy 240. The NONE event detector notifies event manager server 210 of the CLI command which in turn causes policy director 230 to run the corresponding policy 240. It will be appreciated that such functionality can permit an external user of user terminal 130 to selectively trigger the running of any policy 240 registered on network device 110.

Various timer and counter event detectors 220 can also be provided. For example, a timer event detector can be configured to send a notification to event manager server 210 at an absolute time or after a specified time period as measured by hardware or software timers. Similarly, a counter event detector can send a notification when a counter running on network device 110 crosses a specified threshold.

Other event detectors (not shown) can be provided for detecting additional events. For example, a SNMP event detector can be configured to monitor Simple Network Management Protocol (SNMP) management information base (MIB) objects and issue a notification when the object matches particular values or crosses thresholds specified by the policy 240. A system monitor event detector can detect infinite loops, deadlocks, memory consumption, or other operating system processes of network device 110. An application-specific event detector can be configured to provide a notification in response to activities of particular applications running on network device 110.

Other possible events to be detected can include, but need not be limited to: the start, stop, and restart of processes running on network device 110; usage of memory, CPU, inter-process communications, buffers, file system, redundancy states, and other resources of network device 110; state changes in tracked objects; and external communications of network device 110.

Figure 3:
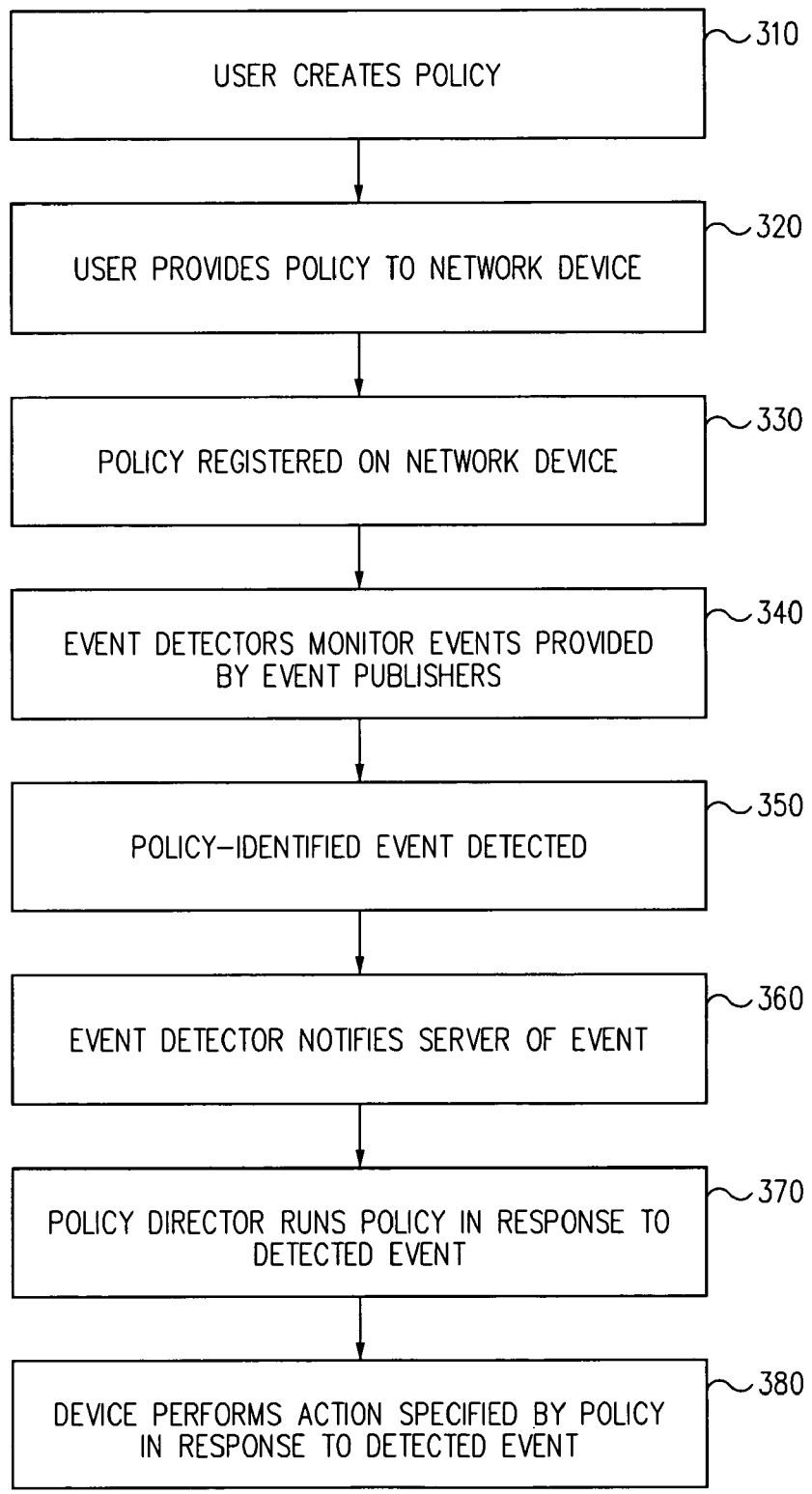
FIG. 3 is a flowchart illustrating a process for providing customizable network device management in accordance with an embodiment of the present invention.

FIG. 3 is a flowchart illustrating a process for providing customized network management in accordance with an embodiment of the present invention. At initial step 310, a user creates a policy 240 for governing the operation of one of devices 110. For example, in the case of a script, the user may prepare a text document at user terminal 130 formatted with an appropriate scripting language to identify events and various actions to be performed in response to the events. In the case of an applet, the user may identify particular events and one or more CLI commands to be executed in response to the events.

The user then provides the policy 240 to the network device 110 (step 320). In this operation, the user will typically access network device 110 over network 120 from user terminal 130. If the user is granted access to a configuration mode of network device 110, the user then proceeds to upload the policy information to network device 110. In the case of a script, the user may first configure one or more variables to be used by the script, and then provide network device 110 with a link to, or the actual content of, a text file associated with the script. In the case of an applet, the user may enter particular events and associated CLI commands to be performed in response to the events.

After the policy 240 has been provided to network device 110, the policy 240 will be registered on network device 110 (step 330). In one embodiment, the registration can be performed through the execution of a CLI configuration command specifying the name of the policy 240. During registration, policy director 230 will subscribe to one or more event detectors 220 corresponding to events specified by the policy 240. Event detectors 220 then proceed to monitor the occurrence of events from various associated event sources 250 (step 340).

If one of event detectors 220 detects that an event specified by one of policies 240 has occurred (step 350), it notifies event manager server 210 of the event, which then informs policy director 230 (step 360). In various embodiments, communication between event manager server 210, event detectors 220, and policy director 230 can be implemented using one or more forms of inter-process communications. In response to the information received from event manager server 210, policy director 230 runs the corresponding policy 240 associated with the event (step 370). For example, this operation may include running a script policy 240 or evaluating conditions specified by an applet policy 240 to determine whether any action is associated with the detected event.

If policy conditions are met, then policy director 230 initiates the associated action, if any, specified by the policy to be performed at the network device 110 (step 380). Policy actions performed in step 380 can include the running of any desired process on network device 110 or the performance of any change in the configuration of network device 110. Thereafter, the process of FIG. 3 can optionally return to step 340 to continue monitoring events.

In view of the present disclosure, it will be appreciated that various features set forth herein provide significant improvements to facilitate the management of network devices 110. For example, by running user-created policies on network device 110, actions conditioned on the occurrence of one or more events can be performed in response to the detection of various events at the network device 110. Such an arrangement can advantageously reduce the user's dependence on providers of the network device 110 to perform software modifications for implementing desired behavior of the network device 110.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored in one or more computer readable mediums. It is also contemplated that software identified herein can be run on one or more general purpose or specific purpose computers and/or computer systems, networked and/or otherwise.

Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the present invention, persons of ordinary skill in the art will recognize that changes may be made in form and detail without departing from the scope of the invention. Thus the invention is limited only by the following claims.

What is claimed is:

1. A method of managing a network device, the method comprising:
   receiving a user-created policy prepared at a user terminal;
   registering the policy on the network device;
   detecting an event occurring at the network device using at least one of a plurality of event detectors, wherein the event is identified by the policy;
   running the policy on the network device in response to the detected event; and
   performing an action specified by the policy in response to the detected event, wherein the action comprises executing a command-line interface (CLI) command specified by the policy.

2. The method of claim 1, wherein the policy comprises a script.

3. The method of claim 1, wherein the policy comprises an applet.

4. The method of claim 1, wherein the policy comprises a set of conditional command-line interface (CLI) commands.

5. The method of claim 1, wherein the method is performed by a server component running on the network device.

6. The method of claim 1, wherein the network device is a router.

7. A network device comprising:
   a data transceiver adapted to facilitate networked data communication;
   a processor in communication with the data transceiver; and
   a memory in communication with the processor, the memory comprising a machine-readable medium having executable instructions adapted to instruct the processor to perform a method of managing the network device, the method comprising:
   receiving a user-created policy prepared at a user terminal,
   registering the policy on the network device,
   detecting an event occurring at the network device using at least one of a plurality of event detectors, wherein the event is identified by the policy,
   running the policy on the network device in response to the detected event, and performing an action specified by the policy in response to the detected event,
   wherein the action comprises executing a command-line interface (CLI) command specified by the policy.

8. The device of claim 7, wherein the policy comprises a script.

9. The device of claim 7, wherein the policy comprises an applet.

10. The device of claim 7, wherein the policy comprises a set of conditional command-line interface (CLI) commands.

11. The device of claim 7, wherein the method is performed by a server software component running on the processor.

12. The device of claim 7, wherein the device is a router.

13. A network device comprising:
   means for receiving a user-created policy prepared at a user terminal;
   means for registering the policy on the network device;
   means for detecting an event occurring at the network device using at least one of a plurality of event detectors, wherein the event is identified by the policy;
   means for running the policy on the network device in response to the detected event; and means for performing an action specified by the policy in response to the detected event, wherein the action comprises executing a command-line interface (CLI) command specified by the policy.

14. The device of claim 13, wherein the device is a router.

15. A computer readable medium having computer readable code for instructing a processor to perform a method of managing a network device, the method comprising:
- receiving a user-created policy prepared at a user terminal;
- registering the policy on the network device;
- detecting an event occurring at the network device using at least one of a plurality of event detectors, wherein the event is identified by the policy;
- running the policy on the network device in response to the detected event; and
- performing an action specified by the policy in response to the detected event, wherein the action comprises executing a command-line interface (CLI) command specified by the policy.

16. The computer readable medium of claim 15, wherein the policy comprises a script.

17. The computer readable medium of claim 15, wherein the policy comprises an applet.

18. The computer readable medium of claim 15, wherein the policy comprises a set of conditional command-line interface (CLI) commands.

19. The computer readable medium of claim 15, wherein the network device is a router.

* * * * *

UNITED STATES PATENT AND TRADEMARK OFFICE
CERTIFICATE OF CORRECTION

PATENT NO.        : 7,656,818 B1                                    Page 1 of 1
APPLICATION NO. : 11/261366
DATED             : February 2, 2010
INVENTOR(S)       : Baroudi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Twenty-eighth Day of December, 2010

David J. Kappos
*Director of the United States Patent and Trademark Office*